SPURIOUS SIGNAL SUPPRESSION IN AUTOMATIC SYMBOL READER

Filed Dec. 29, 1958 5 Sheets-Sheet 1

INVENTORS.
PHILIP E. MERRITT.
BY CARROLL M. STEELE.

ATTORNEY.

SPURIOUS SIGNAL SUPPRESSION IN AUTOMATIC SYMBOL READER

Filed Dec. 29, 1958 5 Sheets-Sheet 2

INVENTORS.
PHILIP E. MERRITT.
CARROLL M. STEELE.
BY [signature]
ATTORNEY.

INVENTORS.
PHILIP E. MERRITT.
BY CARROLL M. STEELE.
[signature]
ATTORNEY.

June 4, 1963 P. E. MERRITT ET AL 3,092,809

SPURIOUS SIGNAL SUPPRESSION IN AUTOMATIC SYMBOL READER

Filed Dec. 29, 1958 5 Sheets-Sheet 4

INVENTORS.
PHILIP E. MERRITT.
BY CARROLL M. STEELE.

[signature]
ATTORNEY.

June 4, 1963 P. E. MERRITT ET AL 3,092,809

SPURIOUS SIGNAL SUPPRESSION IN AUTOMATIC SYMBOL READER

Filed Dec. 29, 1958 5 Sheets-Sheet 5

INVENTORS.
PHILIP E. MERRITT.
BY CARROLL M. STEELE.

ATTORNEY.

United States Patent Office 3,092,809
Patented June 4, 1963

3,092,809
SPURIOUS SIGNAL SUPPRESSION IN AUTOMATIC SYMBOL READER

Philip E. Merritt, Menlo Park, and Carroll M. Steele, Mountain View, Calif., assignors to General Electric Company, a corporation of New York Filed Dec. 29, 1958, Ser. No. 783,350
4 Claims. (Cl. 340—146.3)

This invention relates to a system for automatically reading human language and in particular to apparatus for accurately abstracting information from a document by responding to human language symbols provided thereon in magnetic ink and by ignoring magnetic irregularities thereof.

A United States patent application by P. E. Merritt and C. M. Steele, filed October 31, 1957, Serial No. 693,773, now Patent 2,924,812, granted February 9, 1960, for an Automatic Reading System, which is assigned to the same assignee as the instant invention, describes and claims a system for automatically reading human language which is printed on documents as symbols in ink capable of being magnetized. The symbols are magnetized and translated in sequence past a transducer adapted to generate a distinctive electrical waveshape for each symbol. The waveshape provided by the transducer is applied to a recognition circuit adapted to energize a plurality of output leads, each output lead corresponding to a different one of the symbols to be recognized by the system. When a symbol is scanned by the transducer, the corresponding output lead provides an electrical signal representative of that symbol. The recognition circuit comprises a plurality of transmission channels for receiving the waveshape, each of the channels being adapted to produce an output signal greater than that produced by any other of the channels when the corresponding waveshape is applied to the recognition circuit, and amplitude sensing apparatus for sampling the output signals of all the channels to detect the greatest output signal and in response thereto for delivering a signal on the output lead corresponding to the symbol being scanned.

Information is not always accurately abstracted, however, from a document bearing poorly printed or improper symbols, or when two or more documents adhere together and pass the transducer simultaneously. To prevent delivery of such erroneous information to the utilization apparatus, an error detection means is provided in the above-described equipment. Whenever the amplitude of the greatest transmission channel output signal fails to exceed the next-largest transmission channel output signal by more than a predetermined minimum amount, signals are provided on two or more of the corresponding output leads. The presence of signals on two or more output leads actuates an alarm to denote the presence of an error, so that the data read from the document may be rejected. Thus, the alarm may be actuated whenever the waveshape provided is not distinctive and characteristic of one of the symbols to be recognized.

Magnetic symbol-bearing documents, themselves, are not perfect, and contain defects, such as magnetic irregularities. These magnetic irregularities frequently take two forms. In one form, undesired magnetic ink spots are acquired by the document during printing of the magnetic symbols. In the other form, magnetic wastes, such as iron particles, become embedded in the document when it is manufactured. When a transducer scans one of these magnetic irregularities a waveshape distinctive thereof is produced. Generally, this waveshape is different from the waveshape derived from any of the symbols and it constitutes an improper waveshape, causing an output signal to be provided on two or more of the output leads of the above-described equipment. These multiple output signals denote an error and the document data will be rejected.

Inasmuch as a substantial proportion of these magnetic symbol-bearing documents may contain such irregularities, a corresponding proportion of the data abstracted therefrom will be rejected by the above-described equipment, even though the symbols, themselves, are properly printed and properly pass the transducer. It is desirable, therefore, to provide an improved system for automatically reading magnetic symbols, wherein there is no rejection of abstracted data merely because the document contains magnetic irregularities of the form described.

It is therefore the principal object of this invention to provide an improved system for automatically reading human language magnetic symbols.

Another object of this invention is to provide apparatus for accurately abstracting information from a document by responding to human language symbols printed thereon in magnetic ink and by ignoring magnetic irregularities thereof.

Another object of this invention is to provide apparatus for recognizing each of a plurality of desired waveshapes and for ignoring a spurious waveshape.

Another object of this invention is to provide automatic magnetic symbol reading apparatus that is substantially unaffected by noise signals.

The foregoing objects are achieved by providing $n$ transmission channels in apparatus for recognizing $n-1$ different symbols. Each of $n-1$ of these channels corresponds to the waveshape derived from one of the symbols to be recognized, whereas the remaining channel corresponds to the waveshape derived from the magnetic irregularities. Each channel is adapted to produce an output signal greater than that produced by any other of the channels when the corresponding waveshape is received by all channels. Each of $n-1$ output leads provided corresponds to one of the symbols to be recognized. Amplitude-sensing apparatus samples the output signals delivered by all of the transmission channels and delivers a signal on the output lead corresponding to the channel producing the greatest output signal when the waveshape received is derived from one of the $n-1$ symbols to be recognized. In addition, a photoelectric device senses the leading edge of the document and generates a synchronizing pulse having a duration corresponding to the time interval between the passage of this leading edge and the passage of the first of the symbols on the document past the transducer. While this synchronizing pulse persists, the apparatus is prevented from delivering signals on any of the output leads and is thereby prevented from responding to magnetic irregularities or to noise of any type occurring between the moment when the document reaches the transducer and the moment when the first of the symbols passes thereunder.

The invention will be described with reference to the accompanying drawings, wherein.

Figure 1:
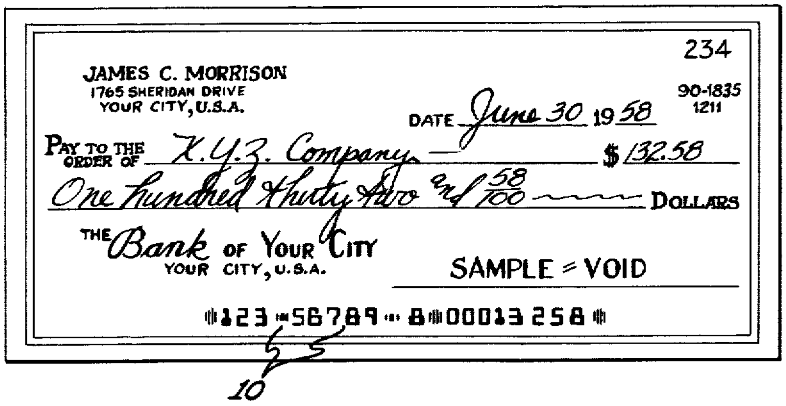
FIGURE 1 illustrates a magnetic symbol-bearing document useful in explaining the operation of this invention.
Figure 2:
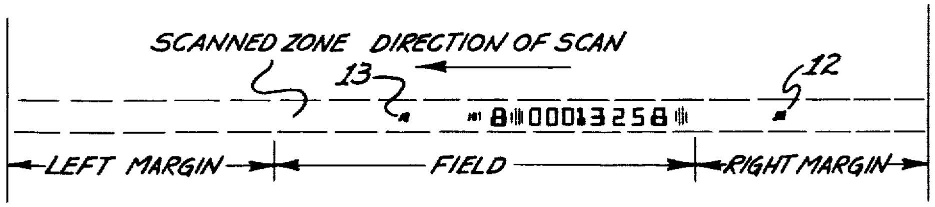
FIGURE 2 illustrates in greater detail the field of FIG. 1.

Exemplary of documents bearing human language symbols printed in magnetic ink, from which the apparatus embodying this invention abstracts information, is the bank check of FIG. 1. A portion of the check near the lower edge thereof is allotted to the printing of magnetic symbols. This portion is termed the field 10 and comprises a plurality of human language symbols printed in ink capable of being magnetized. The check portion aligned with and to the right of the field is identified as the right margin (FIG. 2). The corresponding portion to the left of the field is identified as the left margin.

The term "human language symbol," as used herein, means a figure that conveys information, or is recognizable, from its shape and orientation; such as figures having the shapes and orientations of letters of the alphabet, numerals, punctuation marks, etc. Human language symbols are to be distinguished from permutations and combinations of groups of key elements employed to convey information; such as Morse codes, punched paper tape codes, etc.

Typical information which may be placed in field 10 includes the amount of the check, represented in the example of FIG. 1 by the eight numerals in the extreme right portion of the field; the transaction code number, represented by the single numeral immediately to the left of the amount; the account number, represented by the five numerals immediately to the left of the transaction code number; and the bank branch number, represented by the three numerals in the extreme left portion of the field. In the same check of FIGS. 1 and 2, the amount is $132.58. The transaction code number indicates the nature of the document, such as a debit, credit, etc. The account number specifies the particular bank account to be affected by the document. The bank branch number identifies the bank responsible for administering such bank account. One or more of the items for which space is provided in the field may be omitted on any document. For example, all information but the amount and the transaction code number is omitted from the field of FIG. 2.

Information is abstracted from the field by first magnetizing the magnetic material thereon and then by scanning the field from right to left with a transducer which is responsive to the induced magnetic fields. A zone somewhat wider than the maximum height of the symbols and extending across the document is scanned by the transducer. This zone is included between the pair of broken lines of FIG. 2. In scanning the magnetized symbols, the transducer generates electrical waveshapes characteristic of each different symbol. Apparatus to be subsequently described identifies these characteristic waveshapes and provides outputs indicative of the symbols scanned.

However, if any magnetic irregularities also lie in the scanned zone, they will be magnetized and cause the transducer to generate a characteristic waveshape. If these irregularities lie in one of the margins, such as irregularity 12, or in those portions of the field where magnetic symbols have been omitted, such as irregularity 13, it is desirable, as heretofore mentioned, to provide an automatic reading system which ignores these irregularities, and therefore does not reject the information which is abstracted from symbols actually present in the field of the document. This invention is especially adapted to accurately abstract information from a magnetic symbol-bearing document, while ignoring magnetic irregularities lying apart from the magnetic symbols.

*Theory of Operation*

Figures 3, 4, 5:
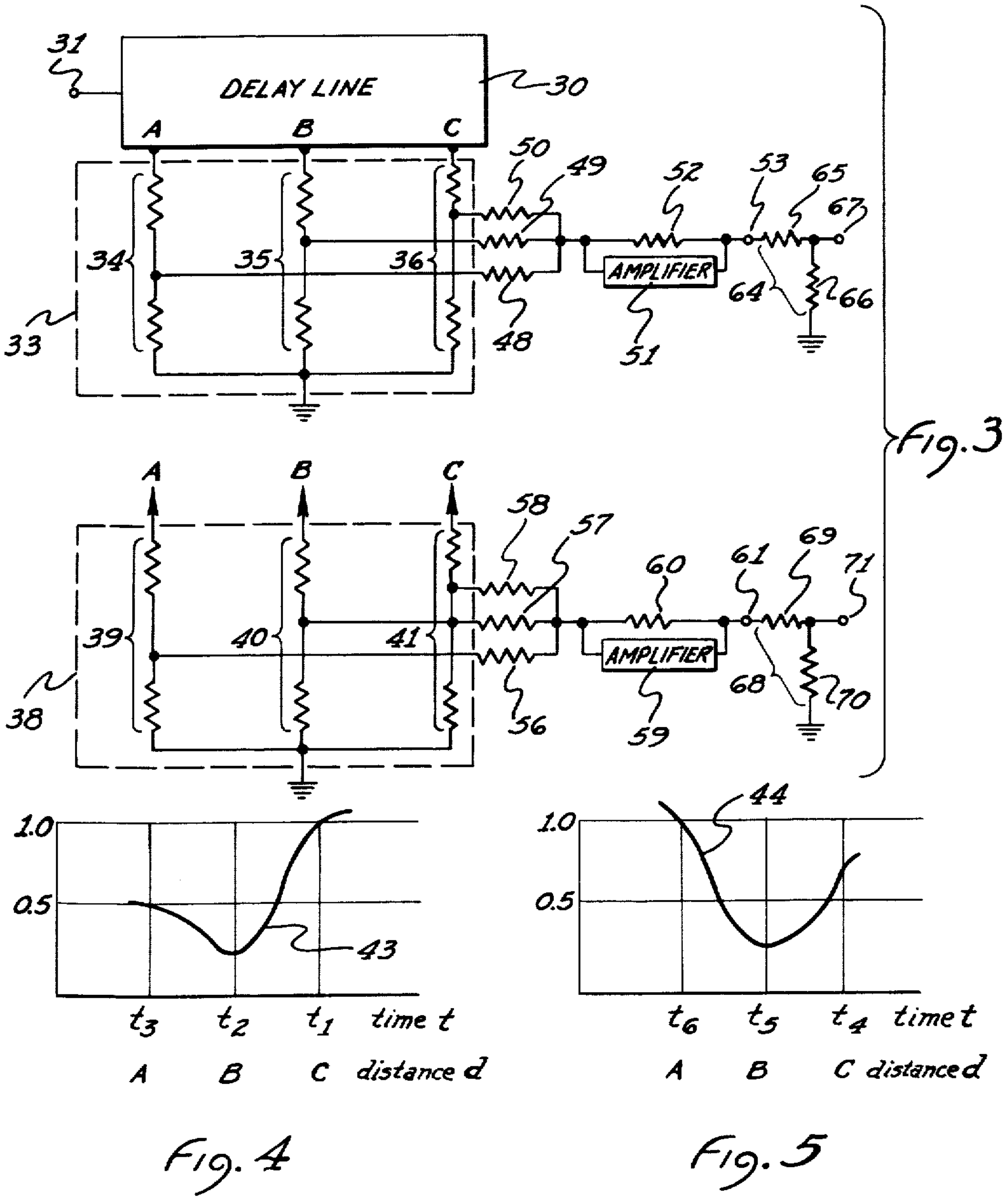
FIGURE 3 is a schematic diagram of a simplified network shown to assist in an understanding of this invention.
FIGURES 4 and 5 illustrate waveshapes of the type for which the network of FIG. 3 is designed to provide recognition.

The simplified network of FIG. 3 is employed to explain the method by which the apparatus of this invention distinguishes between the waveshapes derived from two different symbols to be identified. A delay line 30, which is assumed to be lossless for the purpose of presenting this theory of operation, is provided with an input terminal 31 and with a reflection-free termination, not shown. Three sampling points, A, B, and C, are provided along the delay line. A correlation network 33 comprises a resistor matrix having three voltage dividers 34, 35, and 36, each connected between a respective sampling point and a reference voltage point, such as ground, and additional circuit elements to be described hereinafter. A correlation network 38 comprises a resistor matrix having three voltage dividers 39, 40, and 41, each connected between a respective sampling point and the reference voltage point, and additional circuit elements to be described hereinafter.

Each one of the correlation networks 33 and 38 is adapted to sample a traveling wave of voltage on delay line 30 at three discrete points and to deliver an output signal which is greater than that delivered by the other correlation network when this wave is derived from a respective one of the two different symbols to be identified. The voltage division ratio provided by each voltage divider of a correlation network is determined by the waveshape of the symbol to be recognized by that correlation network. Assume that correlation network 33 is adapted to identify the voltage waveshape illustrated by curve 43 of FIGURE 4, which is derived from one of the symbols to be recognized. Similarly, correlation network 38 is adapted to identify the voltage waveshape illustrated by curve 44 of FIG. 5.

A waveshape as shown in FIGS. 4 and 5 is delivered by the transducer when relative motion is provided between the transducer and the adjacent magnetized symbol. The instantaneous value of voltage delivered corresponds to the portion of the symbol passing the transducer at that instant. For example, the instantaneous voltages appearing at times $t_1$, $t_2$, and $t_3$, respectively, may be those delivered by the transducer when scanning points near the leading edge, the center, and the trailing edge of the symbol. It will be noted that the waveshapes shown in FIGS. 4 and 5 are reversed from conventional presentations, since earlier delivered voltages appear farther to the right than later delivered voltages. This type of presentation will better serve to explain the operation of this invention, as it corresponds to the spatial distribution of a wave along the delay line.

The waveshape of FIG. 4 is applied to delay line terminal 31 and propagates therealong at a velocity determined by the parameters of the line. The voltage delivered at time $t_1$ is that which is applied to terminal 31 first, and it is followed later by the voltages delivered by the transducer at times $t_2$ and $t_3$. Thus, the voltages traveling along line 30 at points most distant from the input terminal 31 are those first delivered by the magnetic transducer. Curve 43 of FIG. 4 is employed for two different representations of these voltages: (1) One representation depicts voltage delivered by the transducer as a function of time, wherein time decreases to the right, as shown by the upper abscissal index, $t$. This representation is usually termed a "waveshape" or "waveform." (2) The other representation depicts the distribution of voltage along the delay line at one instant of time subsequent to $t_3$ as a function of distance along the delay line, as shown by the lower abscissal index, $d$. At a later instant of time, this curve would be shifted to the right in the diagram, since wave propagation is to the right in the delay line. This second representation is, therefore, that of a traveling wave of voltage on line 30. In the particular instant that the traveling wave is illustrated, the voltages delivered by the transducer at times $t_1$, $t_2$, and $t_3$ have arrived at respective sampling points C, B, and A. In FIGS. 4 and 5, the voltages have been normalized to a maximum value of 1.0. That is, the maximum value of the portion of the waveshape to be sampled is set at 1.0 and all other portions of the waveshape are adjusted proportionately. At the instant the traveling wave of FIG. 4 is shown, the normalized voltages at points A, B, and C have the respective values 0.50, 0.25, and 1.00. Similarly, the normalized voltages of the traveling wave of FIG. 5 at points A, B, and C have the respective values 1.00, 0.25, and 0.75.

The voltage division ratio which is provided by each divider of the resistor matrices of correlation networks 33 and 38 is numerically equal to the value of normalized voltage provided at the corresponding sampling point at the moment the respective waveshape is in its illustrated position. This position of a waveshape in the delay line at which sampling point voltages are employed for determining voltage division ratios of the correlation network dividers will be termed the "reference" position for that waveshape. Thus, voltage divider 34 delivers a voltage at its tapped point equal to one-half the voltage sampled at point A, voltage divider 35 delivers a voltage at its tapped point equal to one-quarter the voltage sampled at point B, and voltage divider 36 delivers the entire value of voltage sampled at point C. (In this example, voltage may be taken directly from point C since its associated voltage divider 36 has a ratio of unity.) Therefore, the values of voltage delivered by voltage dividers 34, 35, and 36, when the waveshape of FIG. 4 occupies its reference position in delay line 30, are respectively $0.50 \times 0.50 = 0.25$; $0.25 \times 0.25 = 0.0625$; and $1.0 \times 1.0 = 1.0$.

Similarly, since correlation network 38 is adapted to identify the waveshape of FIG. 5, voltage divider 39 delivers a voltage at its tapped point equal to the entire value of voltage sampled at point A, voltage divider 40 delivers a voltage at its tapped point equal to one-quarter the voltage sampled at point B, and voltage divider 41 delivers a voltage at its tapped point equal to three-quarters the voltage sampled at point C. Therefore, the values of voltage delivered by voltage dividers 39, 40, and 41 when the waveshape of FIG. 4 occupies the reference position in delay line 30, are respectively $1.0 \times 0.50 = 0.50$; $0.25 \times 0.25 = 0.0625$; and $0.75 \times 1.0 = 0.75$.

Referring again to FIG. 3, the respective voltages delivered at the tapped points of dividers 34, 35, and 36 of correlation network 33 are summed algebraically by means of a summing network connected to the tapped points. Three resistors 48, 49, and 50 are connected together at one of their terminals. The other terminal of each of resistors 48, 49, and 50 is connected to the respective tapped point of each of voltage dividers 34, 35, and 36. A high-gain amplifier 51 and a resistor 52 are connected in parallel between the common connection point of resistors 48, 49, and 50 and a terminal 53. Resistors 48, 49, 50, and 52 each have the same value of resistance, so that the voltage delivered at terminal 53 is the algebraic sum of the voltages provided at the tapped points of the three voltage dividers. This common resistance value of resistors 48, 49, 50 and 52 is large compared with the resistance values of voltage dividers 34, 35, and 36, so that the voltages provided at the tapped points of these dividers will be substantially unaffected by the inclusion of the summing network described. (A summing network as shown is described in a book by G. A. Korn, "Electronic Analog Computers," page 11, McGraw-Hill Book Company, Inc., New York, 1952.) At the moment the waveshape of FIG. 4 occupies its reference position in line 30, the summation voltage supplied at terminal 53 has a value of 1.3125, and this voltage is the highest voltage supplied at terminal 53 during passage of the wave of FIG. 4 along the delay line.

Three additional resistors 56, 57, and 58 are connected together at one of their terminals. The other terminal of each of resistors 56, 57, and 58 is connected to the respective tapped point of each of voltage dividers 39, 40, and 41. A high-gain amplifier 59 and a resistor 60 are connected in parallel between the common connection point of resistors 56, 57, and 58 and a terminal 61. In the manner described previously, resistors 56, 57, 58, and 60 each have the same value of resistance, which is large compared with the resistance values of voltage dividers 39, 40, and 41. Thus, a summing network is provided for correlation network 38. At the moment the waveshape of FIG. 4 occupies its reference position in delay line 30, the summation voltage supplied at terminal 61 has the value of 1.3125. (Although the exemplary resistor matrices of FIG. 3 provide equal output voltages at the voltage summation terminals 53 and 61 when the waveshape of FIG. 4 is sampled, this equality is not the general rule. Normally, these summation voltages will differ for each correlation network.)

A voltage divider 64 (FIG. 3), comprising series-connected resistors 65 and 66, is connected between terminal 53 and ground. Divider 64 is adapted to multiply the voltage of terminal 53 by a predetermined factor and to supply the resulting voltage at an output terminal 67, which is connected to the common junction point of resistors 65 and 66. Specifically, divider 64 is designed to multiply the voltage at terminal 53 by a value inversely proportional to the square root to the sum of the squares of the voltage division ratios of the resistor matrix of correlation network 33, in this instance the voltage division ratios of voltage dividers 34, 35, and 36; that is, $$(1) \qquad V_{67} = V_{53} \times \frac{k}{\sqrt{r_{34}^2 + r_{35}^2 + r_{36}^2}}$$

where V represents a terminal voltage, $r$ is a voltage division ratio, and $k$ is a constant of proportionality. For the numerical values of the example described above, $$(2) \qquad V_{67} = V_{53} \frac{k}{\sqrt{1.3125}} = 0.873kV_{53}$$

In this particular instance, $k$ may be set equal to unity, so that the voltage division ratio of divider 64 is 0.873.

A voltage divider 68 comprising series-connected resistors 69 and 70 is connected between terminal 61 and ground. Divider 68 is adapted to multiply the voltage of terminal 61 by a factor corresponding to Equation 1, and to supply the resulting voltage at an output terminal 71, which is connected to the common junction point of resistors 69 and 70. This factor, which is based on the resistor matrix of correlation network 68, is given by, $$(3) \qquad V_{71} = 0.784kV_{61}$$

Since the value of $k$ of Equation 2 was set equal to unity, the value of $k$ of Equation 3 is set equal to unity, so that the voltage division ratio of divider 38 is 0.784.

As has been mentioned previously, when the waveshape of FIG. 4 occupies its reference position in delay line 30, the voltages at terminals 53 and 61 will each be 1.3125. The voltage at output terminal 67 is 1.146 and at output terminal 71 is 1.029. Therefore, the network of FIG. 3 recognizes the waveshape of FIG. 4, and its corresponding symbol, by delivering the larger output voltage at terminal 67. On the other hand, if the waveshape of FIG. 5 occupies its reference position in delay line 30, the voltages at terminals 53 and 61 will be respectively 1.3125 and 1.6250. The voltage at output terminal 67 is 1.146 and at output terminal 71 is 1.273. Therefore, the network recognizes the waveshape of FIG. 5, and its corresponding symbol, by delivering the larger output voltage at terminal 71. Thus, it is desirable that a complete correlation network include the function of the resistor matrix, the function of the summing network, and the function of the voltage divider designed in accordance with the theory of Equation 1.

*A Complete Symbol Recognition System*

In the embodiment of this invention, a correlation network is provided for each different symbol to be recognized. Each correlation network comprises a resistor matrix having a design conditioned by the corresponding waveshape. Each voltage divider of the matrix has a voltage division ratio equal to the value of the normalized voltage provided by the sampling point to which the divider is connected when the corresponding waveshape occupies its reference position in the delay line. Each correlation network further includes a summing network for combining arithmetically the voltages provided at all tapped points of the voltage dividers of the resistor matrix. A further voltage divider in each correlation network multiplies the output voltage of the summing network by a factor determined in accordance with the theory of Equation 1.

The waveshape applied to the delay line is filtered so that its maximum frequency component is less than a predetermined frequency W. The delay line is provided with $h$ or more taps so that the waveshape is sampled at $h$ or more points, where $$h=2WT \qquad (4)$$

and T is the duration of the waveshape. Each correlation network then delivers an output voltage, when the corresponding waveshape occupies its reference position in the delay line, greater than that delivered by any other correlation network. A waveshape is recognized by sensing the output voltages delivered by all correlation networks at the moment the waveshape occupies its reference position in the delay line, by determining the greatest of these voltages, and by producing an output signal identifying the correlation network delivering the greatest output voltage. A theoretical analysis and proof of the operation of a recognition system employing correlation networks, and details of system design are provided in the aforementioned Patent No. 2,924,812.

The above-described theory of operation and the analysis and proof of Patent No. 2,924,812 are based on the premise that no more than one waveshape, or part thereof, is present in the delay line and are further based on the premise that the waveshape present in the delay line is one which the apparatus is designed to recognize; i.e., that the design of one correlation network of the system was conditioned on the waveshape present. One or both of these premises do not exist when a poorly printed or improper symbol is scanned or when two or more documents adhere together and pass the transducer simultaneously. (An improper symbol or waveshape is one which the system is not designed to recognize.) In these instances, although one of the correlation networks will usually deliver an output voltage greater than the other correlation networks, this output voltage will not exceed the next-largest correlation network output voltage by a substantial amount. Consequently, error detection apparatus is employed to actuate an alarm if the largest corelation network output voltage fails to exceed the next-largest output voltage by more than a predetermined amount. Data abstracted from a document wherein such an error is detected is automatically rejected.

A magnetic irregularity wil provide an improper waveshape for a symbol recognition system that comprises only correlation networks having designs conditioned by respective waveshapes derived from symbols to be recognized. Such a system will reject all data abstracted from documents containing magnetic irregularities. (A correlation network whose design is conditioned by a waveshape derived from a symbol to be recognized will be termed a "symbol-associated correlation network.")

However, the symbol recognition system invention described herein will not reject information abstracted from a properly printed and scanned document merely because of magnetic irregularities which are present in the scanned zone. In this invention, the correlation networks are inhibited except during scanning of the field. By this inhibition of the correlation networks, no false system output signals and no error rejection signals are provided when the scanned zone margins are passing the transducer. The invention further provides an additional correlation network, the design of which is conditioned by the characteristic waveshape derived from magnetic irregularities which are relatively small compared with the magnetic symbols to be recognized. (A correlation network whose design is conditioned by a waveshape derived from a magnetic irregularity will be termed an "irregularity-associated correlation network.") The irregularity-associated correlation network prevents rejection of data if such small irregularities are present in any portions of the field wherein symbols have been omitted. This correlation network will provide an output voltage greater than that provided by any one of the symbol-associated correlation networks when a small magnetic irregularity is scanned. Means is provided to sense all correlation network output voltages, and when the greatest of such voltages is provided by the irregularity-associated correlation network, no output signal is provided by the system. Thus, small magnetic irregularities spaced apart from the magnetic symbols neither produce erroneous signals from the system, nor cause the apparatus to reject the information abstracted from the symbols.

*Correlation Networks*

In designing the correlation networks of this invention, the various waveshapes which are derived by scanning the different symbols to be recognized must be known in advance. Each of these waveshapes can be computed from the shape and area of the corresponding symbol or can be determined visually by repeatedly scanning the magnetized symbol with a transducer and applying the output of the transducer to a cathode-ray oscilloscope. The relative amplitudes of a number of points on the waveshape, corresponding to the positions of the delay line sampling points when the waveshape is in its preferred reference position, are used to determine the values of the voltage division ratios of the resistor matrix. From the energy content of the waveshape, an energy weighting factor is computed in accordance with the theory of Equation 1, and an appropriate attenuator is designed to cooperate with the resistor matrix.

Figure 6:
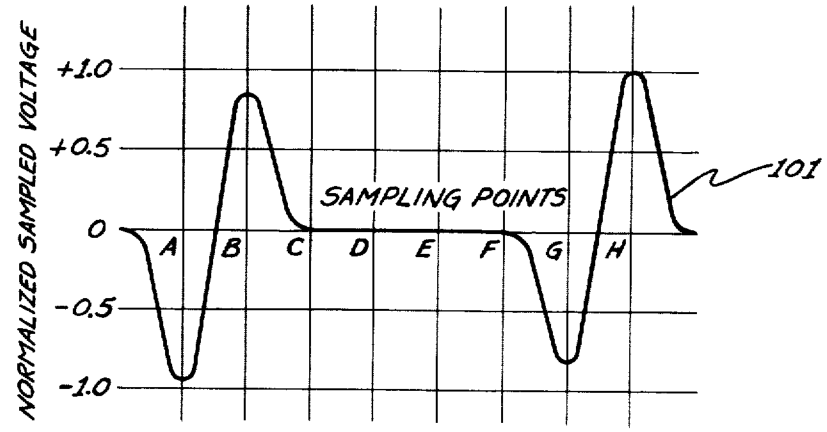
FIGURE 6 illustrates the waveshape derived from one of the symbols which the embodiment of this invention is adapted to recognize.
Figure 7:
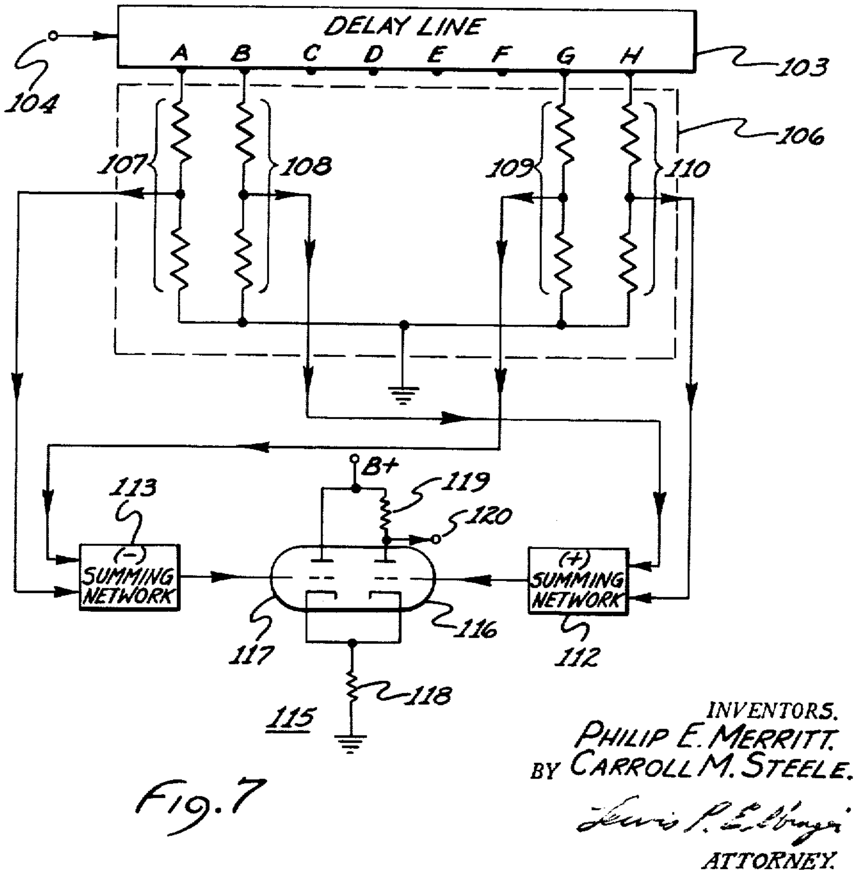
FIGURE 7 is a circuit diagram of a resistor matrix and the summing circuits employed therewith.

FIGURES 6 and 7 illustrate an actual waveshape to be recognized and portions of the correlation network corresponding to this waveshape.

Waveshape 101 of FIG. 6 is that derived by scanning the magnetized numeral "0." The form of waveshape 101 is due to the fact that the transducer employed in this embodiment provides an output signal representing the time rate-of-change of the symbol magnetic flux sensed by said transducer. The "0" waveshape is the longest to be identified by the instant embodiment, and is aproximately of 780 microseconds duration. Waveshape 101 and the other waveshapes to be recognized by this invention have both positive-going and negative-going portions.

A delay line 103 of FIG. 7 is provided with an input terminal 104 to receive the waveshapes to be identified and with the usual reflection-free termination. Delay line 103 is provided with eight sampling points A–H. Adjacent sampling points are spaced apart by the distance a wave travels along delay line 103 in 86.7 microseconds. The total delay provided between sampling points A and H is 606 microseconds. Thus, waveshape 101 is sampled at eight points lying between the extremities thereof.

A resistor matrix 106 comprises voltage dividers 107, 108, 109, and 110, each of which is connected between one of respective sampling points A, B, G, and H and ground. Each of voltage dividers 107–110 is designed with a voltage division ratio equal to the value of normalized voltage provided at the corresponding sampling point when waveshape 101 is in the position shown in FIG. 6. For example, the voltage division ratio of voltage divider 107 is approximately 0.95, and that of voltage divider 108 is approximately 0.85. Inasmuch as the voltages provided at sampling points C–F are substantially zero when waveshape 101 is in its reference position, the corresponding voltage division ratios are zero and, therefore, the corresponding voltage dividers of resistor matrix 106 may be omitted. A procedure for modifying the voltage division ratios of dividers 107–110 when delay line 103 has substantial losses therein is described in the aforementioned patent application S.N. 693,773.

All positive voltages to be delivered by the voltage dividers of matrix 106 when waveshape 101 is in its reference position are added numerically by a suming network 112. Similarly, all negative voltages delivered by the voltage dividers of matrix 106 are added numerically in a summing network 113. Thus, the tapped points of voltage dividers 108 and 110 are connected to summing network 112, and the tapped points of voltage dividers 107 and 109 are connected to summing network 113. Summing networks 112 and 113 may be of the type shown in FIG. 3, or of any other type known in the art.

The output voltages of summing networks 112 and 113 are applied to a difference amplifier 115, the output signal thereof representing the sum of the magnitudes of all the voltages delivered by the voltage dividers of matrix 106 when waveshape 101 is in its reference position. The positive summation voltage delivered by summing network 112 is applied to the control grid of a first electron tube amplifier section 116. The negative summation voltage delivered by summing network 113 is applied to the control grid of a second electron tube amplifier section 117. Section 116 provides a negative output signal proportional to the algebraic difference between the voltages of two input signals applied respectively to the control grid and cathode thereof. Section 117 functions as a cathode follower in order to apply a signal corresponding to that delivered by summing network 113 to the cathode of section 116. The signal applied to the cathode of section 116 by the cathode follower is developed across the cathode follower load resistor 118. (If cathode follower section 117 attenuates the negative summation voltage applied to the cathode of section 116, the positive summation voltage delivered by summing network 112 may be attenuated a corresponding amount by insertion of a voltage divider network between the output terminal of summing network 112 and the control grid of section 116.) The output difference voltage generated by section 116 is developed across a load resistor 119, which is connected to the plate of section 116, and is delivered at an output terminal 120. Therefore, the negative signal provided at terminal 120 represents the sum of the magnitudes of all output voltages delivered by the dividers of resistor matrix 106 when waveshape 101 is in its reference position.

In the complete correlation network, the output signal delivered by terminal 120 is modified by application to a further voltage divider network designed to attenuate the signal applied thereto in accordance with the theory of Equation 1. Although such voltage divider is not shown in FIG. 7, it is described in the subsequent detailed explanation of the operation of a complete symbol recognition system.

The resistor matrices of all correlation networks employed in the complete system are also connected to sampling points A–H of delay line 103. Corresponding voltage dividers of all the resistor matrices are connected in parallel between their respective delay line sampling points and ground. In the embodiment to be subsequently described, fourteen symbols are to be identified, so that the voltage dividers of fourteen symbol-associated resistor matrices and one irregularity-associated resistor matrix are connected to the respective sampling points of delay line 103. In addition to these fifteen resistor matrices, a waveshape presence resistor matrix, to be described later, is also connected to the sampling points of delay line 103.

Figure 8:
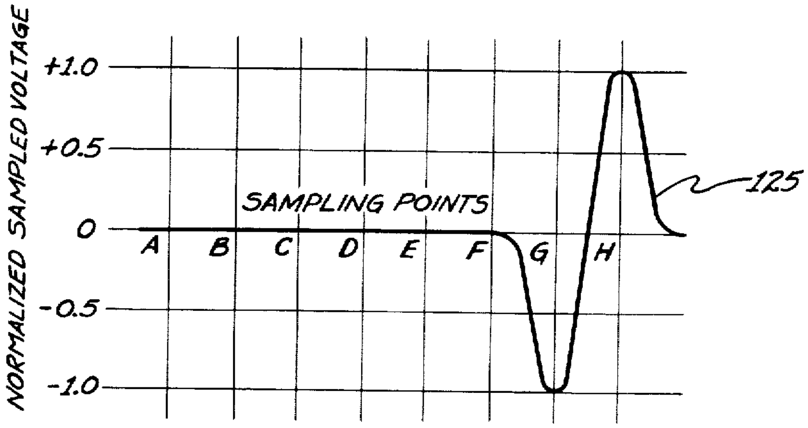
FIGURE 8 illustrates the waveshape derived from a magnetic irregularity.

Waveshape 125 of FIG. 8 is that derived by scanning a magnetic irregularity small in size compared with the symbols to be recognized. This waveshape is of relatively short duration compared with a symbol waveshape and comprises single positive-going and single negative-going portions substantially equal magnitude. The positive and negative peaks of waveshape 125 are shown to coincide with sampling points G and H in the reference position. Although the spacing between these positive and negative peaks may vary slightly with the size of the magnetic irregularity, the frequency-limiting function provided by the transducer and the filter of the embodiment of this invention prevents a substantial deviation in this spacing for magnetic irregularities relatively small compared with the symbols to be identified.

Included in the irregularity-associated correlation network is a resistor matrix 126 (FIG. 9), comprising voltage dividers 127 and 128. Voltage dividers 127 and 128 are connected between respective sampling points G and H of delay line 103. The voltage division ratios of dividers 127 and 128 are substantially equal.

The voltages delivered by dividers 127 and 128 are applied to a difference amplifier 130. The output signal of difference amplifier 130 represents the sum of the magnitudes of the voltages delivered by dividers 127 and 128 when waveshape 125 is in its reference position. Difference amplifier 130 is similar to difference amplifier 115 of FIG. 7. The voltage delivered by divider 128 is applied to the control grid of a first electron tube amplifier section 131. The voltage delivered by divider 127 is applied to the control grid of a second electron tube amplifier section 132. Section 132 functions as a cathode follower and develops its output voltage across a load resistor 133. The output difference voltage generated by section 131 is developed across a load resistor 134, which is connected to the plate of section 131, and is delivered at an output terminal 135. As described previously, the signal delivered by terminal 135 is subsequently modified by a voltage divider network in accordance with the theory of Equation 1.

Figure 9:
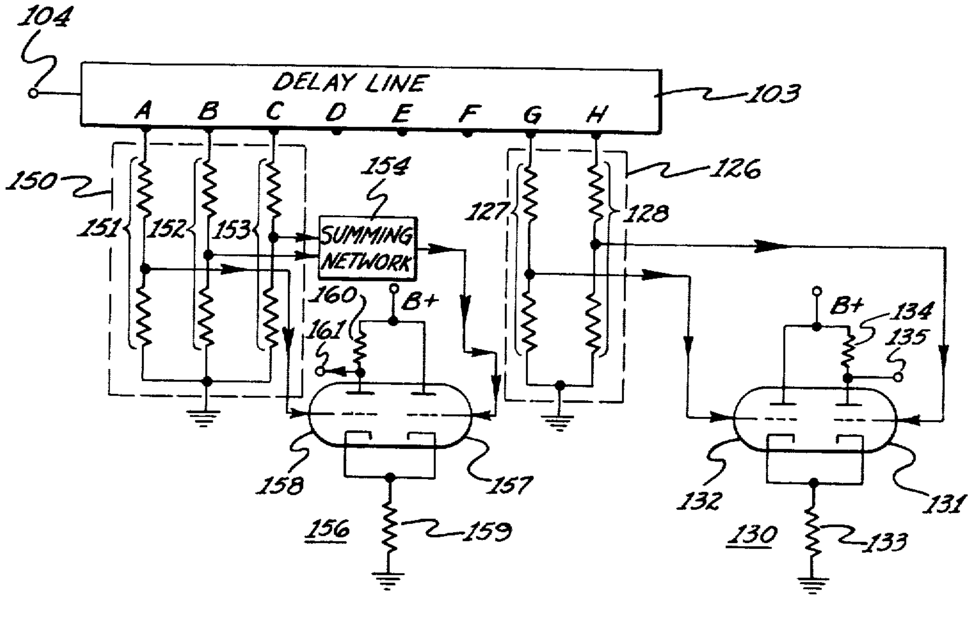
FIGURE 9 is a circuit diagram of two additional resistor matrices and the summing circuits employed therewith.

A waveshape presence resistor matrix 150 is also shown in FIG. 9 and comprises voltage dividers 151, 152, and 153 connected to the respective sampling points A, B, and C of delay line 103. It is the function of resistor matrix 150 and circuit elements associated therewith to sense the presence of the leading edge of a waveshape as it enters delay line 103, and in response thereto, to develop a sampling trigger signal when the waveshape reaches its reference position in the delay line. The voltage division ratios of all of dividers 151, 152, and 153 are alike and may be identified numerically as "y." The tapped points of dividers 152 and 153 are connected to a summing network 154, of the type previously described. The output voltages of summing network 154 and voltage divider 151 are applied to a difference amplifier 156, of the type previously described. Thus, the output signal of difference amplifier 156 is given by (5) $$V=y[V_A-(V_B+V_C)]$$

where $V_A$, $V_B$, and $V_C$ represent the voltages delivered at respective sampling points A, B, and C.

Referring now to waveshapes 101 and 125, it is seen that as either waveshape enters delay line 103, sampling point A is first to deliver an output voltage, which is positive. Thus, the first portion of the leading edge of these waveshapes provides an increasing negative output voltage from difference amplifier 156. As the waveshape progresses farther along line 103, the output voltages from sampling points B and C, which are added together, become increasingly significant. Eventually, the signal delivered by summing network 154 becomes equal to that delivered by voltage divider 151, so that the output voltage of difference amplifier 156 passes through zero and becomes positive. This change in output signal polarity of amplifier 156, occasioned by the advance of the waveshape leading edge along delay line 103, is employed to indicate the arrival of the waveshape in the delay line and to provide the aforementioned sampling trigger signal. This technique is satisfactory for providing timing signals for all symbols and magnetic irregularities, inasmuch as the signals derived from scanning magnetic symbols and irregularities on non-magnetized paper have an initial positive peak when the first portion of each symbol and irregularity is scanned.

*Automatic Symbol Reader Embodiment*

Figure 10:
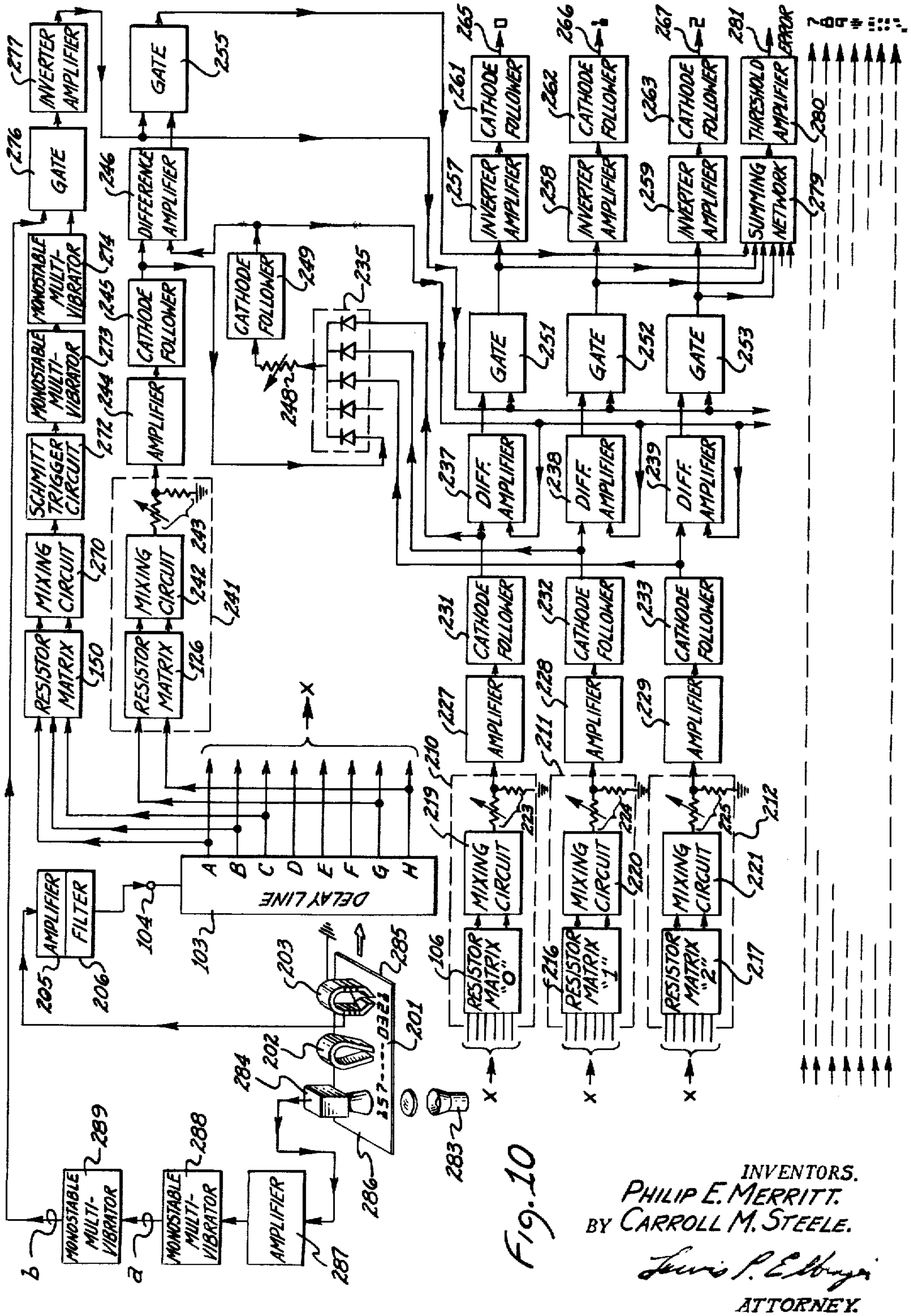
FIGURE 10 is a schematic diagram of an embodiment of this invention.

FIGURE 10 describes a complete embodiment of this invention and includes the correlation networks heretofore described, circuits for interpreting the output signals of the correlation networks, associated input equipment, and circuits for suppressing the influence of magnetic irregularities. This embodiment is adapted to recognize the numerals 0 to 9 and four special symbols. The special symbols are employed to denote the boundaries of the field and the boundaries between the different types of information conveyed in the field. Four special symbols which may be used are shown adjacent the four lowest arrows in the lower right corner of FIG. 10. The use of two of these special symbols is shown in FIG. 1. It is to be understood that the scope of this invention is not limited to the recognation of the numerals and special symbols which the embodiment of FIG. 10 recognizes, but instead, letters and other symbols, such as +, —, punctuation marks, or other geometric configurations may be identified by this invention.

In FIG. 10, there is shown a document 201, such as a sheet of paper, which has symbols imprinted thereon in ink capable of magnetization. These symbols appear in the field as described in connection with FIGS. 1 and 2. Document 201 is moved past a magnet 202 and then passes a transducer 203, which may also be termed "a magnetic reading head." A magnet 202, such as a permanent magnet, magnetizes the symbols to be recognized prior to their "reading" by head 203. Head 203 is responsive to the magnetic flux of the passing magnetized symbols and delivers an output signal corresponding to this flux. The output signal provided by head 203 is a function of time, the magnitude thereof at any instant being determined by the shape and orientation of the magnetized area passing the head at that moment. The output signal of reading head 203 is applied to an amplifier 205, the output signal of which is applied in turn to a low-pass filter 206. The signal passed by filter 206 is applied to input terminal 104 of delay line 103, which has been described previously. Although filter 206 is employed to limit the highest waveshape frequency in accordance with the number of delay line sampling points provided, this filtering function may also be realized in head 203, amplifier 205, or line 103, or any combination thereof.

Fourteen symbol-associated correlation networks are provided. The design of each of these correlation networks is conditioned by a respective one of the symbol waveshapes to be recognized. Although fourteen correlation networks are provided to separately identify the symbols 0 to 9 and the four special symbols, only three symbol-associated correlation networks 210, 211, and 212 and their cooperating electronic apparatus are shown in FIG. 10 for the purpose of simplicity. Each correlation network comprises a resistor matrix, a mixing circuit, and a voltage divider connected in cascade. For example, correlation network 211 comprises a resistor matrix 216, a mixing circuit 220, and a voltage divider 224. Each sampling point of delay line 103 is connected to all corresponding voltage dividers of the resistor matrices of the correlation networks. The design of each correlation network resistor matrix is conditioned by the corresponding symbol waveshape in the manner heretofore described. Each correlation network mixing circuit comprises the necessary positive and negative summing networks and a difference amplifier as shown in FIG. 7. Each of voltage dividers 223, 224, and 225 is designed to attenuate the corresponding mixing circuit output voltage in accordance with the theory of Equation 1.

The apparatus to the right of each of correlation networks 210–212 is employed to interpret the signals provided by the correlation networks, and in response thereto, to deliver an output signal on only one of a number of leads, said output signal corresponding to the symbol scanned. The output signal from each of correlation networks 210–212 is applied to a respective one of amplifiers 227, 228, and 229, where the signal is inverted and amplified. The output signal from each of amplifiers 227–229 is applied in turn to a respective one of cathode followers 231, 232, and 233. The output signal from each of cathode followers 231–233 is applied to a respective one of the diodes of a peak detector 235. The output signal of each of cathode followers 231–233 is also applied to one input terminal of a respective one of difference amplifiers 237, 238 and 239.

As shown in FIG. 9, delay line sampling points G and H are connected to resistor matrix 126 of an irregularity-associated correlation network 241. Correlation network 241 (FIG. 10) comprises resistor matrix 126, mixing circuit 242, and voltage divider 243 connected in cascade. Mixing circuit 242 comprises difference amplifier 130 of FIG. 9. Voltage divider 243 is designed to attenuate the output voltage of mixing circuit 242 in accordance with the theory of Equation 1. The output signal from correlation network 241 is applied to amplifier 244, where it is amplified and inverted. The output signal from amplifier 244 is applied in turn to a cathode follower 245. The output signal from cathode follower 245 is applied in parallel to another diode of peak detector 235 and to one input terminal of a difference amplifier 246.

Peak detector 235 is adapted to receive a plurality of signals applied respectively to the diodes thereof and to deliver a signal at its output terminal substantially equal to the most positive of the received signals. Several forms of peak detectors are well known in the art. A logical OR-gate is one form of peak detector which may also be employed. Fourteen signals from the fourteen cathode followers of the symbol-associated correlation network channels and one signal from the irregularity-associated correlation network channel are applied respectively to the fifteen diodes of detector 235. Thus, the output signal of peak detector 235 is substantially equal to the most positive of these fifteen applied signals.

The output terminal of peak detector 235 is connected to an attenuator 248, which in turn is connected to a cathode follower 249. The function of attenuator 248 will be described below. The output signal from cathode follower 249 is applied to the other input terminal of each of the fifteen difference amplifiers; i.e., difference amplifiers 237–239 and 246. Each of difference amplifiers 237–239 and 246 may be of a type well known in the art, such as that shown in FIG. 7. Other useful difference amplifiers are shown in a book by G. E. Valley, Jr., and H. Wallman, "Vacuum Tube Amplifiers," sec. 11.10 McGraw-Hill Book Co., Inc., New York, 1948. The difference amplifier employed in FIG. 10 is one which provides an output voltage that is positive with respect to an arbitrary reference voltage only if a signal applied to one of its input terminals exceeds a signal applied to its other input terminal; otherwise, the output voltage is negative. Each of difference amplifiers 237–239 and 246 is so connected that only when the signal received from the corresponding one of cathode followers 231–233 and 245 exceeds the signal received from cathode follower 249 does it deliver such a positive output voltage.

Attenuator 248 is adjusted to attenuate the signal applied thereto by a small predetermined amount so that the only one of the difference amplifiers 237–239 and 246 which delivers a positive output voltage is the one receiving the most positive signal from cathode followers 231–233 and 245. More specifically, attenuator 248 is so adjusted that the signal delivered by cathode follower 249 is always more positive than the second largest signal provided by cathode followers 231–233 and 245 for every waveshape derived from a symbol to be recognized or from a small magnetic irregularity when such waveshape occupies its reference position in the delay line.

Thus, when any one of the waveshapes to be recognized or the irregularity-associated waveshape is applied to delay line 103, only the corresponding one of difference amplifiers 237–239 and 246 delivers a positive output voltage when the waveshape is at its reference position. However, when an improper waveshape is present, the most positive output voltage from cathode followers 231–233 and 245 may not exceed the next-greatest output voltage by an amount greater than the amount of attenuation provided by attenuator 248, so that the output signal from cathode follower 249 is greater than two or more of the signals provided by cathode followers 231–233 and 245. Thus, two or more of difference amplifiers 237–239 and 246 will deliver a positive output voltage. When two or more of difference amplifiers 237–239 and 246 deliver positive output voltages, an alarm is actuated by apparatus to be subsequently described.

The output signals from difference amplifiers 237–239 and 246 are applied to respective signal input terminals of gates 251, 252, 253, and 255. Each of these gates is an amplifier type of gate, providing an output signal that is the amplified inverse of its gated input signal. Only when the input signal and a gating pulse applied thereto each exceed a reference or threshold voltage does the gate conduct. Suitable gates for this purpose are shown in a book by Engineering Research Associates, "High Speed Computing Devices," sec. 4–3–3, McGraw-Hill Book Co., Inc., New York, 1950. The object of gates 251–253 and 255 is to provide for sampling the output voltages of the corresponding difference amplifiers only when the waveshape is in its reference position in the delay line. A positive sampling trigger signal, which is provided when the waveshape reaches its reference position, is applied as the gating pulse to the other input terminal of each of gates 251–253 and 255. In this manner, erroneous output signals are avoided when the waveshape is not in its reference position. Furthermore, false output signals are avoided when two symbols are spaced so closely together that portions of the wave shapes derived therefrom are in delay line 103 simultaneously.

Each of the gates of the symbol-associated correlation network channels is connected to an inverter amplifier. Thus, gates 251, 252, and 253 are connected respectively to one of inverter amplifiers 257, 258, and 259. Only those gates receiving a positive input signal from the corresponding difference amplifier will deliver output signals, which are of negative polarity. These output signals of gates 251–253 are amplified and inverted by inverter amplifiers 257–259 and applied to a respective one of cathode followers 261, 262, and 263. Each of cathode followers 261–263 delivers its output signal on a respective one of output leads 265, 266, and 267. Therefore, whenever a waveshape reaches its reference position in delay line 103, a sampling trigger signal actuates gates 251–253 in order to sample the respective output voltages of difference amplifiers 237–239. If the waveshape was derived from one of the symbols to be recognized, a positive output signal will be provided by the corresponding one of the output leads of the symbol-associated correlation network channels. For example, if the symbol "0" was scanned, a signal is provided on lead 265. If an improper waveshape is present, output signals will usually be provided on two or more of these output leads.

Generation of a sampling trigger signal is initiated in the previously described resistor matrix 150, which samples the leading edge of the waveshape as it enters delay line 103. Resistor matrix 150 is shown connected to a mixing circuit 270, which comprises summing network 154 and difference amplifier 156 of FIG. 9. The output signal of mixing circuit 270 of FIG. 10 is that of difference amplifier 156. As has been previously described, the swing of the output signal of mixing circuit 270 through zero to a positive value is employed to indicate the arrival of the waveshape in the delay line.

The output signal of mixing circuit 270 is applied to a Schmitt trigger circuit 272. The Schmitt trigger circuit is a well-known type of network which is driven from a first state to a second state, where it remains so long as the input voltage applied thereto exceeds a predetermined level. Upon reduction of the input voltage to a particular lower level, the Schmitt trigger circuit returns to its first state. An example of such a circuit is shown in the book by L. W. von Tersch and A. W. Swago, "Recurrent Electrical Transients," page 277, Prentice-Hall, Inc., New York, 1953. Thus, trigger circuit 272 is driven to its second state when the output signal of mixing circuit 270 goes through zero and becomes positive. The output signal of trigger circuit 272 is applied to a first monostable multivibrator 273, which in turn drives a second monostable multivibrator 274. Each of these monostable multivibrators delivers an output signal at a predetermined time after application of an input signal thereto. Multivibrator 273 determines the delay before an output pulse is provided by multivibrator 274, following the time when the output signal of mixing circuit 270 passes through zero and becomes positive. This delay is that necessary for the waveshape to move to a position close to its reference position in the delay line. Multivibrator 274 generates a positive output signal having a duration equal to that of the desired sampling trigger signal. The sampling trigger signal is sufficiently broad, for example of approximately 15 microseconds duration, to insure that the waveshape reaches its reference position during the occurrence thereof. The output signal of multivibrator 274 is applied to the signal input terminal of a gate 276, which is similar to gates 251–253. The output signal of gate 276 is applied to an inverter amplifier 277. Inverter amplifier 277 develops the positive samping trigger signal, which is applied as a gating pulse to each of gates 251–253 and 255.

When the sampling trigger signal is applied to the gates of the symbol-associated correlation network channels, a signal is provided by the corresponding gate if the waveshape present in line 103 is one derived from a symbol to be recognized. If the waveshape present in the line is an improper one, two or more of these gates will usually provide an output signal, an alarm is actuated, and all data from that document is rejected. The waveshape derived from a magnetic irregularity constitutes an improper wave shape for recognition apparatus containing only symbol-associated correlation networks. Such a waveshape would result in two or more channels providing an output signal and consequent rejection of data from the document containing the irregularity. However, the recognition apparatus of FIG. 10 includes an irregularity-associated correlation network channel so that the irregularity-derived waveshape is no longer an improper one and the corresponding gate is the only one providing an output signal. Inasmuch as no output lead is provided for such additional channel, the apparatus is effective to "absorb" or ignore such waveshapes since it neither provides an output signal therefrom, nor provides an error signal to reject data from the document. Therefore, irregularity-associated correlation network 241 and the circuits associated therewith are effective to prevent delivery of a signal on one of the output leads and to prevent rejection of data if small irregularities are present in portions of the field wherein symbols have been omitted.

As has been previously described, an improper waveshape, which is one derived from neither a symbol to be recognized nor a magnetic irregularity, causes output signals to be delivered by two or more of the gates of the correlation network channels, such as from gates 251–253 and 255. The output terminal of all of these correlation network channel gates are connected to respective input terminals of a summing network 279. Summing network 279 is adapted to provide an output signal corresponding to the algebraic sum of the input signals applied thereto, such as the summing networks previously described. Thus, the amplitude of the output signal of summing network 279 corresponds to the number of gates providing output signals. The output terminal of summing network 279 is connected to the input terminal of a threshold amplifier 280. Such an amplifier may be of many types, such as an amplifier biased beyond cut-off. Threshold amplifier 280 is adapted to provide an output signal on an output lead 281 whenever the input signal applied thereto exceeds a predetermined level, and more specifically to provide an output signal when summing network 279 receives two or more input signals. Therefore, a signal delivered on lead 281 is indicative of the fact that an improper waveshape has been received by the apparatus, and such signal constitutes an alarm. This output signal of lead 281 will normally be employed to reject all the data derived from the document being scanned.

Figure 11:
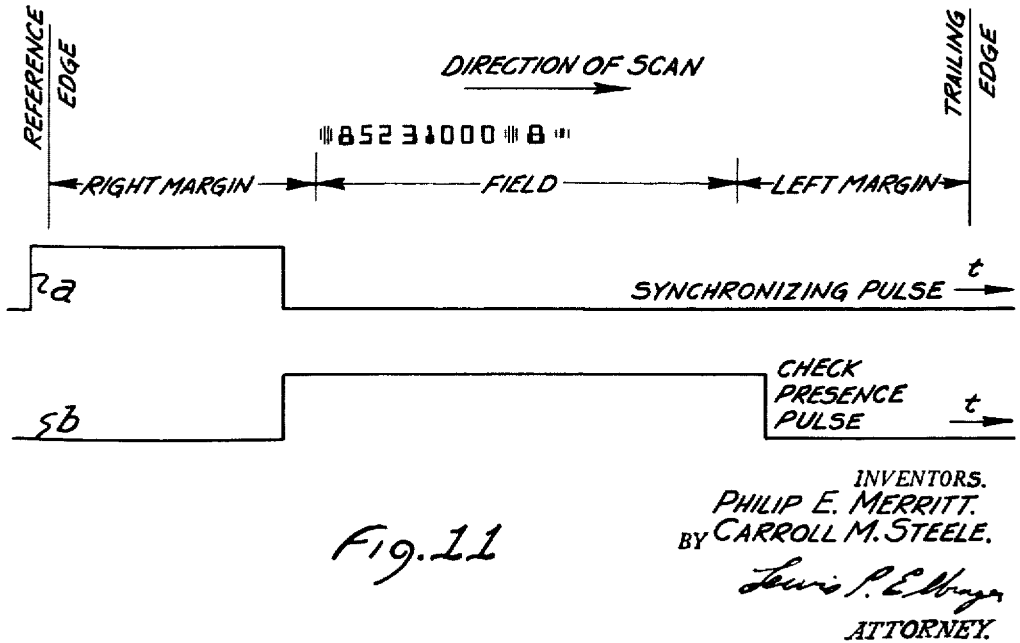
FIGURE 11 illustrates various waveforms useful in explaining the operation of the embodiment of FIG. 10.

Gate 276 and circuits for generating the gating pulses applied thereto serve to prevent application of the sampling trigger signal to gates 251–253 and 255 when the scanned zone margins are passing the transducer, and thereby serve to prevent rejection of data due to all magnetic irregularities in said margins and due to other noise induced in the transducer at this time. The details of the portion of FIG. 10 wherein the sampling trigger pulse is suppressed will now be described. The ensuing description will be supplemented by reference to the waveforms of FIG. 11. In FIG. 11, the waveforms generated at various points in the circuit of FIG. 10 are depicted and their approximate temporal relationship with respect to the portion of the document scanned zone passing the transducer at any given moment is shown. Inasmuch as the zone is scanned from right to left, the right margin is shown occurring first in the diagram and the left margin subsequently.

The beam from a source of light 283 is directed to strike a radiation-sensitive device 284, such as a phototransistor. A number of photosensitive semiconductor devices useful for this application are described in the book by R. F. Shea, "Principles of Transistor Circuits," sections 21.5 to 21.5.4, John Wiley & Sons, Inc., New York, 1953. A relatively large output signal is provided by the phototransistor when the beam from source 283 impinges thereon. When the beam is interrupted, the output signal of the phototransistor is reduced to a relatively small value. Thus, at the moment the reference edge 285 of document 201 interrupts the light beam, the output signal of the phototransistor drops and is maintained at a low level until the trailing edge 286 of the document releases the light beam.

The output signal of the phototransistor is applied to an amplifier 287. The output signal from amplifier 287 is applied to a monostable multivibrator 288. The decrease in output signal level from the phototransistor is effective to drive monostable multivibrator 288 into its unstable state, where it remains for a predetermined duration. The synchronizing pulse of waveform "*a*" in FIG. 11 is delivered by monostable multivibrator 288 in its unstable state. The duration of this synchronizing pulse is approximately equal to the time that elapses between the moment when reference edge 285 interrupts the light beam and the moment when the right boundary of the field arrives at transducer 203. When the phototransistor lies ahead of transducer 203, as shown in FIG. 10, the duration of the synchronizing pulse must be correspondingly greater than the time interval required for the right margin to pass the tranducer. A margin of safety is allowed to prevent circuit parameter variations and document velocity deviations from causing the synchronizing pulse to extend beyond the time when the first symbol waveshape enters delay line 103.

The synchronizing pulse of multivibrator 288 is applied to a monostable multivibrator 289. Multivibrator 289 is driven to its unstable state by the trailing edge of the synchronizing pulse applied thereto. Multivibrator 289 delivers the check presence pulse of waveform "*b*" in its unstable state. The duration of the check presence pulse is approximately equal to the time interval required for the field of document 201 to pass transducer 203. The check presence pulse is applied to the other input terminal of gate 276 and serves as a gating pulse therefor. Thus, gate 276 is enabled to pass signals only during that time when the field is opposite transducer 203. Sampling trigger signals are thus suppressed and cannot enable gates 251–253 and 255 when the right and left margins of the scanned zone of the document are passing the transducer. Therefore, neither false output signals nor error-denoting signals can be delivered by this apparatus due to magnetic irregularities lying in the document margins, due to noise induced by the document edges striking or leaving transducer 203, or due to any other noise entering the apparatus when the margins are opposite the transducer. Furthermore, when no document is opposite the transducer, the circuits described prevent the delivery of spurious output signals due to noise.

There has thus been described apparatus for automatically recognizing human language symbols printed on a selected portion of a document in magnetic ink wherein said apparatus is substantially unaffected in its operation by the presence of magnetic irregularities apart from the symbols in either the selected portion of the document or external to said portion. Furthermore, this apparatus is substantially unaffected by all other disturbances, such as noise, when scanning said document external to said portion.

While the principles of the invention have now been made clear in illustrative embodiments, there will be immedately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. Apparatus for recognizing each of a plurality of different desired waveshapes and for ignoring a spurious waveshape, comprising a plurality of first correlation networks equal in number to the number of said different desired waveshapes, each of said first networks corresponding to one of said desired waveshapes, a second correlation network corresponding to said spurious waveshape, distributing means having an input terminal for receiving any one of said waveshapes and having a plurality of output terminals for delivering respective portions of said one waveshape, means for connecting said output terminals to all of said networks, a plurality of output leads equal in number to the number of said first networks, each of said leads corresponding to one of said first networks, and amplitude comparison means connected to all of said output leads for receiving the output signals of all of said networks, said amplitude comparison means being adapted to sense the output signals received thereby to determine the one of said output signals having the greatest amplitude and being further adapted to deliver a signal on the output lead corresponding to the network producing said greatest amplitude output signal when one of said first networks delivers said greatest amplitude output signal and to inhibit signals on all of said output leads when said second network delivers said greatest amplitude output signal.

2. In apparatus for recognizing human language symbols printed on a document with magnetic ink, and document also bearing extraneous magnetic particles, the combination of: a sensing device for scanning said document and for producing a different symbol signal in response to each different printed symbol and for producing a spurious signal in response to extraneous magnetic particles; a plurality of symbol recognition channels, one for each of the symbols to be recognized, connected to said sensing device for receiving signals produced by said scanning and each channel adapted to produce the highest output signal upon receipt of the corresponding symbol signal; an output circuit for receiving signals from said symbol recognition channels and normally operable to produce a symbol output signal corresponding to the symbol recognition channel having the highest output signal; a spurious signal recognition channel connected to said sensing device for receiving signals produced by said scanning and for producing an output signal upon receipt of a spurious signal; and means responsive to said output signal of said spurious signal channel for inhibiting symbol output signals from said output circuit when the output signal of said spurious signal channel is higher than the output signal of any one of said symbol recognition channels.

3. In apparatus for receiving a plurality of different signals, for recognizing desired information signals, and for ignoring a spurious signal, the combination of: a plurality of information signal recognition circuits, one for each information signal, for receiving said signals and for producing recognition circuit output signals in response thereto; a plurality of information signal output lines, one for each information signal; a sensing circuit for sensing said recognition circuit output signals and normally operable in response thereto to produce an output signal on the signal output line corresponding to the received information signal; a spurious signal recognition circuit for receiving said signals and operable to produce an output signal in response to a received spurious signal; and means responsive to said output signal of said spurious signal recognition circuit for inhibiting output signals on all of said information signal output lines.

4. In apparatus for receiving a plurality of different signals including desired information signals to be recognized and a spurious signal, the combination of: a plurality of information signal recognition channels for receiving said signals, one for each of the information signals to be recognized, each operable to produce the highest output signal in response to the corresponding information signal; a spurious signal recognition channel for receiving said signals and operable to produce an output signal in response to a spurious signal; a plurality of information signal output lines, one for each of said information signal recognition channels; and an amplitude comparison circuit for receiving output signals from said information signal and spurious signal recognition channels and for normally producing an information output signal on the information signal output line corresponding to the information signal recognition channel which produces the highest output signal and for producing output signals on information signal output lines corresponding to information signal recognition channels which produce output signals greater than a predetermined portion of said highest output signal, said amplitude comparison circuit being operable to inhibit signals on said information signal output lines in response to a signal from said spurious signal channel which is higher by a predetermined amount than the highest of the output signals from said information signal recognition channels.

References Cited in the file of this patent

UNITED STATES PATENTS

| | | |
|---|---|---|
| 2,602,918 | Kretzmer | July 8, 1952 |
| 2,612,550 | Jacobi | Sept. 30, 1952 |
| 2,701,303 | Wells | Feb. 1, 1955 |
| 2,773,981 | Goodall | Dec. 11, 1956 |
| 2,804,606 | Reaves | Aug. 27, 1957 |
| 2,817,771 | Barnothy | Dec. 24, 1957 |
| 2,884,616 | Fillebrown et al. | Apr. 28, 1959 |
| 2,894,247 | Relis | July 7, 1959 |
| 2,894,248 | Relis et al. | July 7, 1959 |
| 2,901,739 | Freitas | Aug. 25, 1959 |
| 2,924,812 | Merritt et al. | Feb. 9, 1960 |
| 2,944,734 | Martin | July 12, 1960 |
| 2,961,649 | Eldredge et al. | Nov. 22, 1960 |

FOREIGN PATENTS

| | | |
|---|---|---|
| 785,853 | Great Britain | Nov. 6, 1957 |

UNITED STATES PATENT OFFICE
CERTIFICATE OF CORRECTION

Patent No. 3,092,809 June 4, 1963

Philip E. Merritt et al.

It is hereby certified that error appears in the above numbered patent requiring correction and that the said Letters Patent should read as corrected below.

Column 14, line 49, for "samping" read -- sampling --; column 16, lines 47 and 48, for "immedately" read -- immediately --; column 17, line 18, for "and" read -- said --.

Signed and sealed this 24th day of December 1963.

(SEAL)
Attest:

ERNEST W. SWIDER
Attesting Officer

EDWIN L. REYNOLDS
Acting Commissioner of Patents